US012567820B2

(12) United States Patent

Remele et al.

(10) Patent No.: US 12,567,820 B2

(45) Date of Patent: Mar. 3, 2026

(54) METHOD FOR OPERATING A GENERATOR SET, DEVICE FOR OPERATING A GENERATOR SET, AND GENERATOR SET

(71) Applicant: Rolls-Royce Solutions GmbH, Friedrichshafen (DE)

(72) Inventors: Jörg Remele, Hagnau (DE); Andreas Krammer, Bodolz-Enzisweiler (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 25 days.

(21) Appl. No.: 18/423,486

(22) Filed: Jan. 26, 2024

(65) Prior Publication Data

US 2024/0162841 A1 May 16, 2024

Related U.S. Application Data

(63) Continuation of application No. PCT/EP2022/070984, filed on Jul. 26, 2022.

(30) Foreign Application Priority Data

Jul. 26, 2021 (DE) ..................... 10 2021 119 328.1
Jul. 26, 2022 (WO) ................. PCT/EP2022/070984

(51) Int. Cl.
H02P 9/00 (2006.01)
F02D 29/06 (2006.01)
(Continued)

(52) U.S. Cl.
CPC ................ H02P 9/04 (2013.01); F02D 29/06 (2013.01); H02P 2101/25 (2015.01); H02P 2103/20 (2015.01)

(58) Field of Classification Search
CPC .............. F02D 29/06; F02D 2200/101; F02D 2250/18; F02D 41/1401; H02P 9/04;
(Continued)

(56) References Cited

U.S. PATENT DOCUMENTS 10,027,128 B2 7/2018 Müller
10,181,728 B2 * 1/2019 Shakeel .................... H02J 3/42
(Continued)

FOREIGN PATENT DOCUMENTS

CN 112260290 A 1/2021
DE 102005026062 A1 * 4/2007 ............. F03D 9/005
(Continued)

OTHER PUBLICATIONS

International Search Report and Written Opinion dated Nov. 28, 2022 for International Patent Application No. PCT/EP2022/070984 (16 pages).
(Continued)

*Primary Examiner* — Julio C. Gonzalez
(74) *Attorney, Agent, or Firm* — TAYLOR & EDELSTEIN, PC

(57) ABSTRACT

A method for operating a generator set includes: providing the generator set includes an internal combustion engine and a generator connected to an engine of the internal combustion engine in a torque-transmitting manner; specifying a generator set frequency and a generator set phase of a voltage of a power produced by the generator; adapting a torque-forming combustion control variable for the engine; operating the engine in a phase controlled mode by regulating an engine phase via a phase regulator to change a generator set phase, the engine phase being in a predetermined phase relationship with the generator set phase; setting the variable for adapting the engine phase to a target engine phase; determining an engine target phase by a target phase generator upstream of the phase regulator, subject to a calculated rotational reference system that describes a rotary motion of a fictitious inertia-increasing mass with a virtual stabilization speed.

20 Claims, 4 Drawing Sheets

(51) Int. Cl.
   *H02P 9/04*        (2006.01)
   *H02P 101/25*      (2016.01)
   *H02P 103/20*      (2016.01)

(58) Field of Classification Search
   CPC .............. H02P 2101/25; H02P 2103/20; H02J
                2300/10; H02J 3/38; H02J 3/42; H02J
                                       3/381; H02J 3/46
   See application file for complete search history.

(56)              References Cited

U.S. PATENT DOCUMENTS

2014/0058646 A1*   2/2014  Shimada ............. F02D 41/1462
                                                       701/104
2017/0170764 A1*   6/2017  Blackwelder ............ H02P 6/20
2017/0218870 A1*   8/2017  Yang ....................... F02D 41/08

2018/0041153 A1    2/2018  Pendray et al.
2022/0294230 A1*   9/2022  Arnold ................... F02D 37/02

FOREIGN PATENT DOCUMENTS

DE     10 2010 030 093  A1    12/2010
WO       2004/073137  A1     8/2004
WO       2018/122726  A1     7/2018

OTHER PUBLICATIONS

"Virtuelle Schwungmasse", Martin Boxleitner and Günther Brauner,
6. Internationale Energiewirtschaftstagung an der TU Wien/IEWT
2009 (10 pages).
English translation of "Virtuelle Schwungmasse", Martin Boxleitner
and Günther Brauner, 6. Internationale Energiewirtschaftstagung an
der TU Wien/IEWT 2009 (10 pages).

\* cited by examiner

METHOD FOR OPERATING A GENERATOR SET, DEVICE FOR OPERATING A GENERATOR SET, AND GENERATOR SET

CROSS REFERENCE TO RELATED APPLICATIONS

This is a continuation of PCT application no. PCT/EP2022/070984, entitled "METHOD FOR OPERATING A GENERATOR SET, DEVICE FOR OPERATING A GENERATOR SET, AND GENERATOR SET", filed Jul. 26, 2022, which is incorporated herein by reference. PCT application no. PCT/EP2022/070984 claims priority to German patent application no. 10 2021 119 328.1, filed Jul. 26, 2021, which is incorporated herein by reference.

BACKGROUND OF THE INVENTION

1. Field of the Invention

The present invention relates to generator sets.

2. Description of the Related Art

The generator set (also referred to as "Genset") includes a generator, an internal combustion engine and a generator set controller (also referred to as Genset controller), wherein the internal combustion engine has an engine (which can also be referred to herein a motor) and a control unit (also referred to as "ECU" for electronic control and regulator unit or engine control unit), wherein the engine is connected with the generator in a torque transmitting manner. To feed electrical power into a power grid, in particular an electrical supply grid, the generator should be synchronized with the grid. This applies in particular to a synchronous generator.

The generator set includes a generator, an internal combustion engine and a generator set controller, wherein:

the internal combustion engine has an engine and an engine control unit ("ECU") and a combustion actuator that is connected to the engine control unit for control, and which is controllable by way of a combustion control variable for torque-forming combustion adjustment of the engine, and the generator—at a generator rotational speed—is drive connected to the engine at an engine rotational speed in order to generate a generator voltage at a generator voltage frequency in the generator, in particular for generating the generator voltage as a terminal voltage at the generator, wherein the grid voltage has assigned to it a grid frequency and a grid voltage phase, and the generator has assigned to it a generator voltage frequency and a generator voltage phase.

Optionally, the method for synchronizing the generator set with respect to the power grid provides for the synchronization of the generator voltage with respect to the grid voltage. In operation during the synchronization process, the synchronous generator is not yet connected to deliver from and/or feed electrical power into the power grid; in other words, a load switch or main switch at the connection point of the generator is not yet closed; in this state, no power is generated.

Optionally, however, the method is designed to ensure that the generator set already generates a generator voltage in such a way that it is prepared for the power grid to deliver and/or feed in electrical power, in particular to complete the synchronization operation of the generator set (genset) with respect to the power grid and/or a subsequent operation.

The method mentioned at the beginning for operating a generator set with an internal combustion engine and a generator connected to an engine of the internal combustion engine in a torque-transmitting manner provides for the generation of the generator voltage, whereby the supply grid has assigned to it a grid frequency, a grid voltage and a grid phase. In particular, before coupling or synchronizing the generator, it is intended to generate the generator voltage as a terminal voltage at the generator and to subsequently provide an electrical power to an electrical supply grid or, in the case of a feed-in, to accept the electrical power from it, whereby a grid frequency, a grid voltage and a grid phase are assigned to the supply grid.

The method includes the following steps:

Specifying a generator set frequency and a generator set phase of a voltage of the power generated by the generator, in particular subject to a generator set speed during operation of the internal combustion engine, Adapting a torque-forming combustion control variable for the engine.

Methods of operating a generator set, in particular under consideration of the stability of an electical supply grid are generally known.

In modem energy supply systems, so-called balancing energy is becoming increasingly important for grid stabilization. Today's electrical supply grids make it necessary to take stabilization measures into account, among other things due to the increased use of renewable energy sources such as photovoltaics and wind energy and the associated causes of instability. To the extent that an energy supply causes fluctuations in the grid due to high dynamics of renewable energy sources and could thus contribute to grid instabilities at least locally with higher dynamics, a so-called balancing energy that compensates for these fluctuations is therefore increasingly valuable or necessary. However, a generator set (also called Genset) can be operated at comparative stability with an internal combustion engine with one engine, which is why a generator set is particularly suitable to provide this so-called balancing energy.

The statics or the droop represents a characteristic curve that is characteristic of a power generator, especially a generator set, and describes the change in frequency or speed at load changes.

WO 2018/122726 A1 describes a control system for microgrids for the generation and distribution of electrical energy from various generating sources, connected to a supply grid and isolated. In WO 2018/122726 A1, an adaptation of a droop to changes in voltage and frequency of a supply grid is generally described.

U.S. Pat. No. 10,027,128 B2 describes a so-called droop operating mode, in which a droop is permitted depending on an engine load.

The grid stability of an electrical supply grid and, in particular, the consideration of droop properties of a generator set in conjunction with other power generators and/or in a supply grid are also problematic.

If an electrical supply grid is loaded, the entire energy for the electrical load surge initially comes from the kinetic energy of the rotating masses of all generators in the grid. Therefore, according to the state of the art, larger power plants—due to their higher rotating masses—offer a better possibility of accepting load surges and thus a stabilizing effect on the electrical supply grid. Only when the speed decreases due to the withdrawl of energy from the rotating masses does the combustion engine of a state-of-the-art generator set recognize—via the frequency-controlled droop characteristic—that it should generate more torque. At this point, however, the speed has already dropped.

It would be desirable to alleviate the aforementioned problems, at least partially.

What is needed in the art is an improved method for operating a generator set, wherein the generator set contributes to a high degree toward grid stability. In particular, what is needed in the art is a generator set which can react to dynamic load surges.

SUMMARY OF THE INVENTION

In a first aspect, the invention relates to a method for operating a generator set. In a second aspect, the invention relates to a device for operating a generator set. In a third aspect, the invention relates to an internal combustion engine and to a generator set.

The present invention provides a method for operating a generator set with an internal combustion engine and a generator connected to a engine of the internal combustion engine in a torque-transmitting manner for providing electrical power to an electrical supply grid or for receiving the electrical power from the latter, wherein a grid frequency, a grid voltage and a grid phase are associated with the supply grid, including the steps:

Specifying a generator set frequency and a generator set phase of a voltage of the power produced by the generator, in particular subject to a generator set rotational speed during operation of the internal combustion engine, Adaptation of a torque-forming combustion control variable for the engine.

According to the present invention the method provides the following steps:

operating the engine of the internal combustion engine in a phase controlled mode by regulating an engine phase via a phase regulator to change the generator set phase, wherein the engine phase is in a known phase relationship with the generator set phase, and the torque-forming combustion control variable for the engine is set for adaptation of the engine phase to a target engine phase, and the engine target phase is determined by way of a target phase generator upstream of the phase controller, subject to a calculated rotational reference system that describes the rotary motion of a fictitious, inertia-increasing mass with a virtual stabilization speed.

In other words, the engine target phase is the phase of the inertia-increasing mass rotating at the virtual stabilization speed. In a further development, the engine target phase can be determined by way of a target phase generator upstream of the phase regulator using a model of a virtual seismic mass based on a virtual stabilization speed of the virtual seismic mass.

The present invention is based on the consideration that control energy, that is, electric energy present in a frequency and in a phase that has a stabilizing effect on a supply grid, is advantageous for the supply grid. This is the case, in particular, if the supply grid is a stand-alone grid and/or has a number of relatively small power generators, in particular generator sets.

The present invention is based on the recognition that a generator set has a relatively low rotating mass and thus a lower mass inertia compared to a large turbine with generator used in a large power plant.

The present invention has recognized that although a droop is required for stationary load balancing, it would be desirable if the generator set would dynamically control the engine to a higher torque faster than the static droop curve specifies in the event of a frequency dip. This can be achieved by allowing the combustion engine to react dynamically to even small frequency drops.

The present invention includes the realization that if the engine of the generator set is operated in a phase regulating mode, an engine phase of the engine can be controlled with phase accuracy, and thus the generator set phase of the generator that is firmly connected to the engine in a torque transmitting manner can be controlled, in particular with respect to a grid phase. Due to the fixed torque-transmitting connection of the generator to the engine, the engine phase is always in a defined geometrical relationship to the generator set phase.

By adjusting the torque-forming combustion control variable for the engine, the generator set speed and consequently also the engine phase can be adjusted to the exact phase, and the engine phase can—in phase regulating mode—be adjusted to an engine target phase mode in order to specifically influence the generator set phase.

By determining the engine target phase from a target phase generator upstream of the phase controller via a model of a virtual seismic mass on the basis of a virtual stabilization speed of this virtual seismic mass, it is moreover possible in particular to synchronize the engine phase not only to a grid phase, but also to take other boundary conditions into account when calculating the virtual stabilization speed. These boundary conditions include, in particular, the grid frequency and the grid phase as well as a stalling threshold of the generator. Due to the virtual stabilization speed and in particular the associated consideration of such boundary conditions, a dynamic component of a so-called virtual seismic mass can be superimposed according to the present invention with respect to the currently known static droop characteristic of the generator set. The virtual seismic mass is a computational rotational reference frame that advantageously describes the kinetic behavior of a fictitious, relatively large rotating mass. The mass is relatively large, especially compared with the actual rotating mass of the generator set.

Thanks to a virtual mass characteristic in the form of the virtual seismic mass, the generator set can provide additional control energy from the resulting phase difference to a calculated virtual seismic mass, which results from an early torque increase of the combustion engine and have a beneficial stabilizing effect on the supply grid, especially in the event of load changes, even with the smallest changes in grid frequency.

The torque-forming combustion control variable is a combustion control variable for the torque-forming combustion settings of the engine.

In a further development, the combustion control variable for the torque-forming combustion setting of the engine is selected from the group consisting of: fuel injection control variable, gas injection control variable, throttle valve control variable; in particular the combustion control variable for the torque-forming combustion adjustment of the engine includes in particular a fuel allocation parameter for the engine, in particular an injector or injection parameter and/or a throttle parameter and/or ignition parameter.

The combustion actuator connected to the engine control unit, which can be controlled by way of a combustion control variable for torque-forming combustion adjustment of the engine, advantageously includes a fuel allocation device in the embodiment of an injector, injection and/or throttle and/or ignition device, including optionally an injection device for fuel injection or a gas injection device in the case of a diesel or gasoline engine and/or a throttle valve to adjust a gas mixture flow in a gas engine and/or a carburetor flap to adjust an internal combustion mixture in a gasoline engine.

A further development provides that the generator is a synchonous generator.

It is provided, in particular, that the virtual stabilization speed is assigned subject to the grid frequency and the grid phase. The virtual stabilization speed corresponds initially to a calculated rotational motion in which the rotational speed, that is, the angular velocity of the virtual seismic mass in the unit of 1/sec. or Hz, corresponds to the grid frequency. In optional further developments it is not the current grid frequency that is used as a basis for determining the virtual stabilization speed, but rather a grid frequency from the past, in particular a grid frequency occurring before a load change, in particular before a load surge. The phase of this rotational speed of the virtual stabilization speed corresponds to the engine-target phase and is determined accordingly on the basis of the grid phase, whereby the engine-target phase, in particular, is not equal to the grid phase, but is adapted in order to reduce the risk of stalling and/or to increase a torque transmittable via the generator, taking into account a critical generator pole wheel.

Advantageously it is provided that the virtual stabilization speed can be adjusted depending on a stalling threshold, in such a way that the engine target phase and/or a target pole wheel angle assumes a value between 0° and the stalling threshold. In such further development it is advantageously ensured that the engine target phase does not deviate more than an amount corresponding to the stalling threshold from the current engine phase representing the actual generator set phase of the generator set. In particular, the engine target phase does not precede the engine phase (and thus of the generator set phase) further than the amount of the stalling threshold. This reduces, in particular avoids, the risk of unfavorable stalling of the generator, while at the same time providing an advantageous rapid transfer of torque from the engine to the generator to stabilize the grid, especially after a load surge.

A further development provides that the engine target phase is determined subject to a transmission curve of the generator. The torque that can be transmitted by a generator as a function of a pole wheel angle is stored in such a transmission curve. Using such a transmission curve, a transmission behavior of the generator subject to the pole wheel angle can be generated in a targeted manner.

In particular, it is provided that the engine target phase is determined in such a way that a transmission torque of the generator is increased, in particular that a maximum torque is achieved. In such a further development, the pole wheel angle is set in particular in phase regulating mode in such a way that a maximum value for the transmission torque is achieved in accordance with the transmission curve. In this way, the torque transmitted by the engine—or absorbed in the event of a load surge—can be advantageously increased, in particular maximized, and at the same time stalling of the generator can be avoided by taking the transmission curve into account.

Advantageously it is provided that a value of the transmission curve for positive values of a pole wheel angle is less than or equal to a corresponding value of a maximum torque curve of the generator. The transmission curve can advantageously be formed in such a way that its magnitude is always below a (maximum transmittable) torque curve of a generator, which—in particular irrespective of the pole wheel angle—advantageously prevents the stalling torque from being exceeded.

Adapting a torque-forming combustion control variable for the engine advantageously involves adjusting one or more torque-forming combustion control variables selected from the group consisting of: fuel injection control variable, gas injection control variable, throttle position control variable.

In particular, it is provided that the torque-forming combustion control variable is a fuel injection control variable, advantageously an injection quantity. The internal combustion engine of the generator includes, in particular, an injection device. By adjusting the fuel injection control variable, it is possible to intervene in the phase control, especially in regard of an actuator. Increasing in the injection quantity can result in particular in an increase in the torque and/or speed of the engine, as a result of which the engine phase and thus also the generator set phase can be aligned with the engine target phase. Accordingly, in a case where there is a risk of exceeding the stalling angle, the injection quantity can be reduced to prevent the generator from stalling. Alternatively or additionally, other torque-forming combustion control variables can also be adjusted within the scope of the method, such as an injection duration, an injection timing and/or similar control variables.

It is provided in particular that the stalling threshold is 90°. The stalling threshold can also assume a value other than 90°, in particular for technical and/or geometrical reasons, in particular subject to the number of pole pairs of the generator.

In a further development it is advantageously provided that the transmission curve is designed as a machine-proportional transmission curve. The fact that a machine-proportional transmission curve of the generator set is proportional to at least one other machine-proportional transmission curve of at least one other generator set means, in particular, that two machine-proportional transmission curves may be different in magnitude, but may have the same proportionality coefficient. In particular, two machine-proportional transfer curves have the same progression, but are scaled over a different, constant factor. A machine-proportional transmission curve can be used to achieve a uniform load acceptance behavior, especially with differently dimensioned generator sets. In particular, a number of generator sets, each with a different rated power, can together have a common droop characteristic for stabilizing the supply grid by way of a machine-proportional transmission curve, while at the same time preventing stalling in each generator set—regardless of its size.

A further development provides that the engine phase is determined by way of a phase position of the crankshaft, in particular as a time function of an engine angle and/or phase position of the crankshaft.

In an optional further development, it is provided that the generator voltage frequency and/or the generator voltage phase is calculated from the engine speed and/or the engine phase by taking into account a number of pole pairs of the generator and/or by taking into account a mechanical blocking angle between the internal combustion engine and the generator.

In a second aspect, the present invention provides a device for operating a generator set, wherein the generator set has an internal combustion engine and a generator connected to an engine of the internal combustion engine for torque transmission and is designed to feed electrical power into an electrical supply grid, wherein a grid frequency, a grid voltage and a grid phase are assigned to the supply grid, a generator set control system is designed to specify a generator set frequency and a generator set phase of a voltage of the power generated by the generator, in particular subject to a generator set speed during operation of the internal combustion engine, an engine control unit is designed to adapt a torque-forming combustion control variable for the engine.

In the device according to the second aspect of the present invention, it is provided that the device includes a phase regulator, designed to operate the engine of the internal combustion engine in a phase-controlled mode by regulating an engine phase to change the generator set phase, wherein the engine phase is in a defined geometrical relationship to the generator set phase, and the engine control unit is designed to adjust the torque-forming combustion control variable for the engine to adapt the engine phase to an engine target phase, and the engine target phase is determined by way of a target-phase generator upstream of the phase regulator subject to a computational rotational reference system that describes the rotational motion of a fictitious, inertia-increasing mass with a virtual stabilization speed.

In an optional further development, the device has a target-phase generator upstream of the phase regulator, which is designed to determine an engine target phase via a model of a virtual seismic mass based on a virtual stabilization speed of a virtual seismic mass.

In the device, the advantages of the method according to the first aspect of the present invention are accordingly utilized.

In a further development of the device, a damping element is provided.

In a further development of the device, a transmission curve adaptation module is provided, designed for adjustment of a machine-proportional transmission curve, wherein the machine-proportional transmission curve of the generator set is proportional relative to the at least one other machine proportional transmission curve of at least one additional generator set. A transmission curve adaptation module can in particular have a number of different machine proportional transmission curves in order to make a generator set adaptable to operation in different combinations of generator sets, in particular with generator sets of different sizes.

In a further development of the device, a speed filter is provided, designed to filter out combustion-related torsional vibration surges from a generator set signal of the generator set speed. A damping element can have an advantageous damping effect on the device for operating the generator set, which functions in the sense of a phase control loop, and in particular effectively prevents the device from oscillating, especially during load surges.

In a third aspect, the present invention provides a generator set with an internal combustion engine and a generator connected to an engine of the internal combustion engine in a torque-transmitting manner for supplying a supply grid with energy, having a device according to the second aspect of the present invention for operating the generator set.

The generator set utilizes the advantages of the method according to the first aspect of the present invention and the device according to the second aspect of the present invention accordingly.

A further development advantageously provides, that the engine is connected to the generator via a drive shaft in a torque-transmitting manner, whereby during operation of the internal combustion engine a rotor is rotationally driven relative to a stator of the generator to generate generator voltage at the generator voltage frequency, in particular that the generator which is connected to the engine of the internal combustion engine in a torque-transmitting manner is in the embodiment of a synchronous generator, is connected rigidly or by way of a gearbox.

Embodiments of the present invention are described below, with reference to the drawings, in comparison to the state of the art, which in part is also illustrated. The embodiments are not necessarily shown to scale but, where necessary for explanatory reasons, the drawings are presented in schematic and/or in slightly distorted images. It should be noted that a variety of modifications and changes can be made to the shape and detail of an embodiment without departing from the general idea of the present invention. The features of the present invention disclosed in the description, in the drawings and in the claims can be essential for the further development of the present invention both individually and in any combination. In addition, all combinations of at least two of the features disclosed in the description, the drawings and/or the claims fall within the scope of the present invention. The general idea of the present invention is not limited to the exact form or detail of the optional embodiment shown and described below, or limited to any subject matter that would be limited as compared to the subject matter claimed in the claims. In the case of specified design ranges, values of within the stated limits should also be disclosed as threshold values and can be used and claimed as desired. Additional advantages, features and details of the present invention can be seen from the following description of the optional embodiments and from the drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
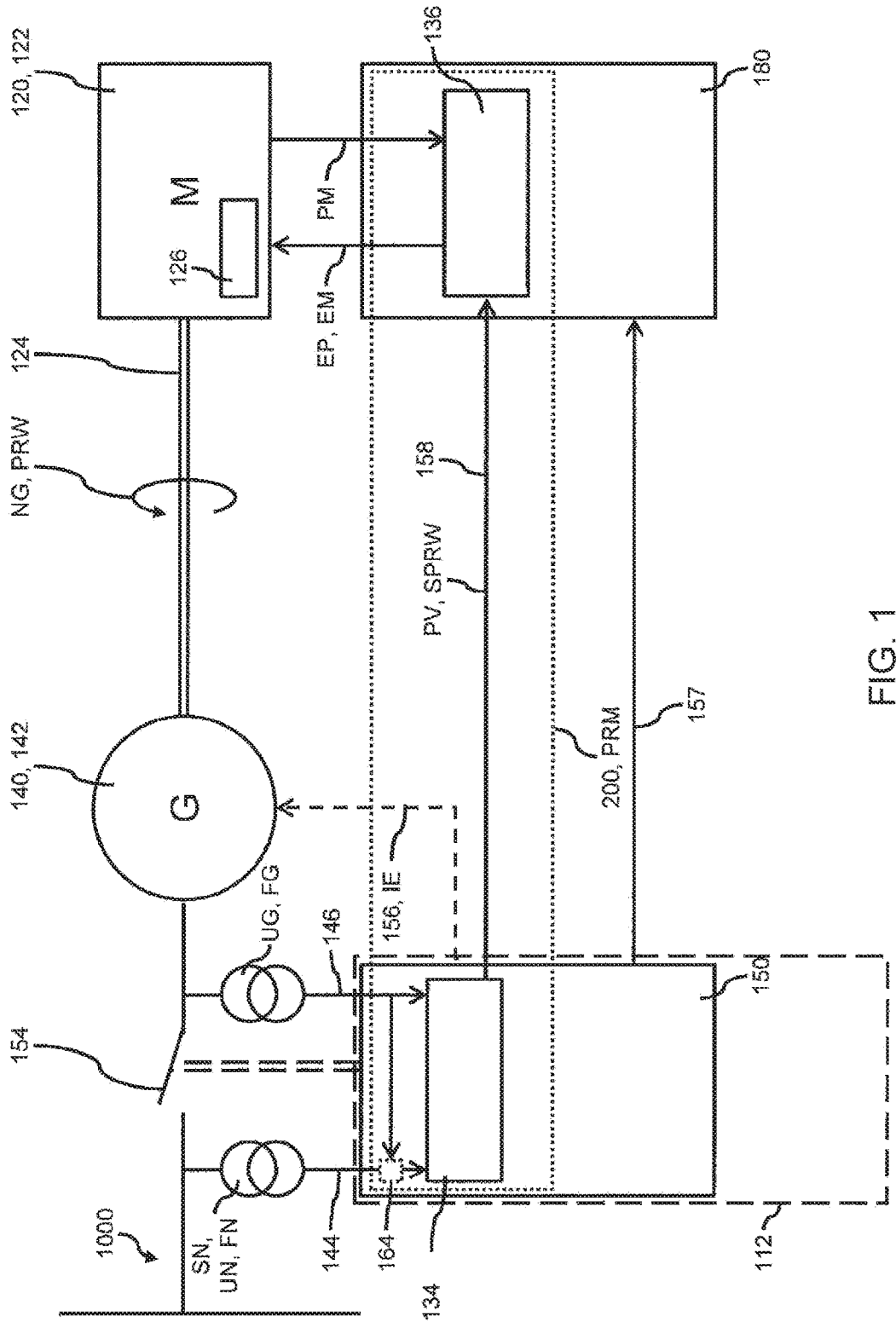
FIG. 1 shows a generator set with a device for operating a generator set according to the concept of the invention.

FIG. 1 shows a generator set 100 with an engine 122 of an internal combustion engine 120 and a generator 140, which in the present example is designed as a synchronous machine 142—herein namely as a synchronous generator—for producing electricity. A generator set controller 150 can be used to determine a grid signal SN of a supply grid 1000—in particular a grid voltage UN, a grid frequency FN and a grid phase PN—by way of a phase detector 134 via a grid signal line 144 and to compare these values with a generator set signal SG of the generator 140; in particular a generator set voltage UG, a generator set frequency FG and a generator set phase PG—recorded via a generator signal line 146, a generator set frequency FG and a generator set phase PG—are compared, in particular in order to establish a current-carrying connection via a switch 154 only when these variables match sufficiently. In particular, generator set controller 150 can be designed as part of a converter 112 of generator set 100.

Generator set controller 150 is connected via a speed control line 157 to an engine control unit 180 of an engine 122 of an internal combustion engine 120 in a signal-carrying manner, in order to increase or decrease a generator set speed NG as required, in particular to adapt a generator set frequency FG to a grid frequency FN in speed-controlled operation. Since engine 122 in the present case is connected to generator 140 by way of a main shaft 124, the speed of engine 122 corresponds to the speed of generator 140. Thus, in the present example, engine 122 and generator 140 have the common generator set speed NG. In further developments in which a gearbox is connected between engine 120 and generator 140, the speed may differ, but there may be a defined relationship to each other, which makes it possible to clearly convert the speeds and, in particular, the phases, that is, from an engine phase to the generator set phase.

Device 200 for operating generator set 100 can include generator set controller 150 and engine control unit 180 or can also be designed as part of the two.

Generator set controller 150 is moreover designed to apply an excitation current IE to generator 140 via an excitation line 156, in particular to adjust generator set voltage UG and/or generator set frequency FG.

Engine control unit 180 has a phase regulator 136, which can determine and/or adjust a torque-forming combustion control variable EP for engine 122 subject to a phase difference PD determined by phase detector 134, in particular an engine target phase PV.

For this purpose, phase detector 134 is connected to phase controller 136 via a phase regulator line 158. By way of phase controller 136 it is thus possible to control the engine subject to a phase and in particular a phase difference PD by way of a torque-forming combustion control variable, in particular an injection quantity EM and/or an injection timing, in order to adjust an engine phase PM, in turn to influence generator set phase PG. This is advantageous for phase-accurate control of the engine, in particular in contrast to the above-mentioned speed-controlled operation of engine 122. Engine 122 is equipped in particular with an injection system 126.

Figures 3A, 3B:
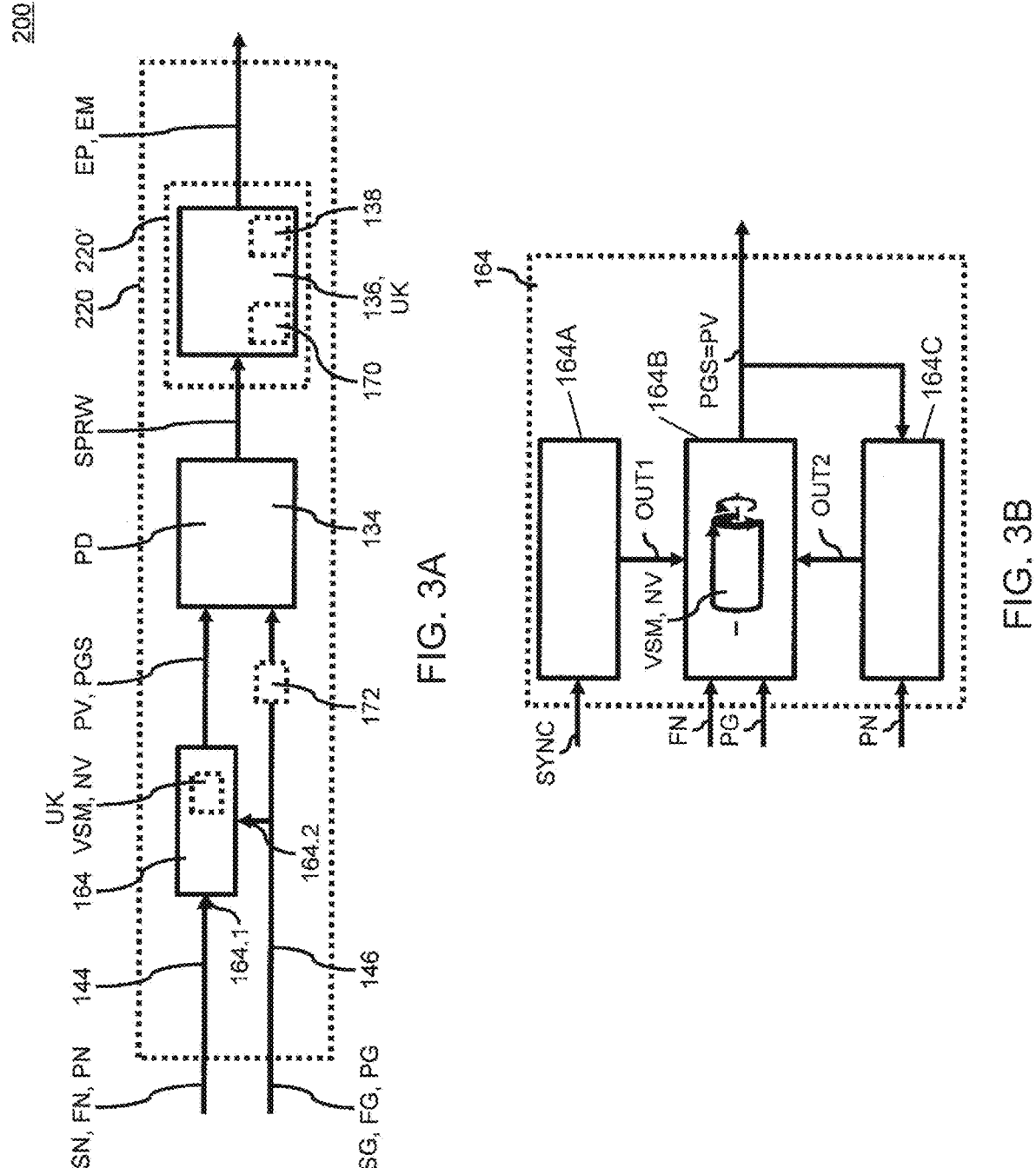
FIG. 3A is a detailed representation of a device for operating the generator set according to the concept of the invention.
FIG. 3B is a detailed schematic representation of a target phase generator.

Phase detector 134 and phase regulator 136 are part of a device 200 for operating a generator set, which in particular has the functionality of a phase control loop and is described in more detail in FIG. 3A.

Figures 2A, 2B, 2C:
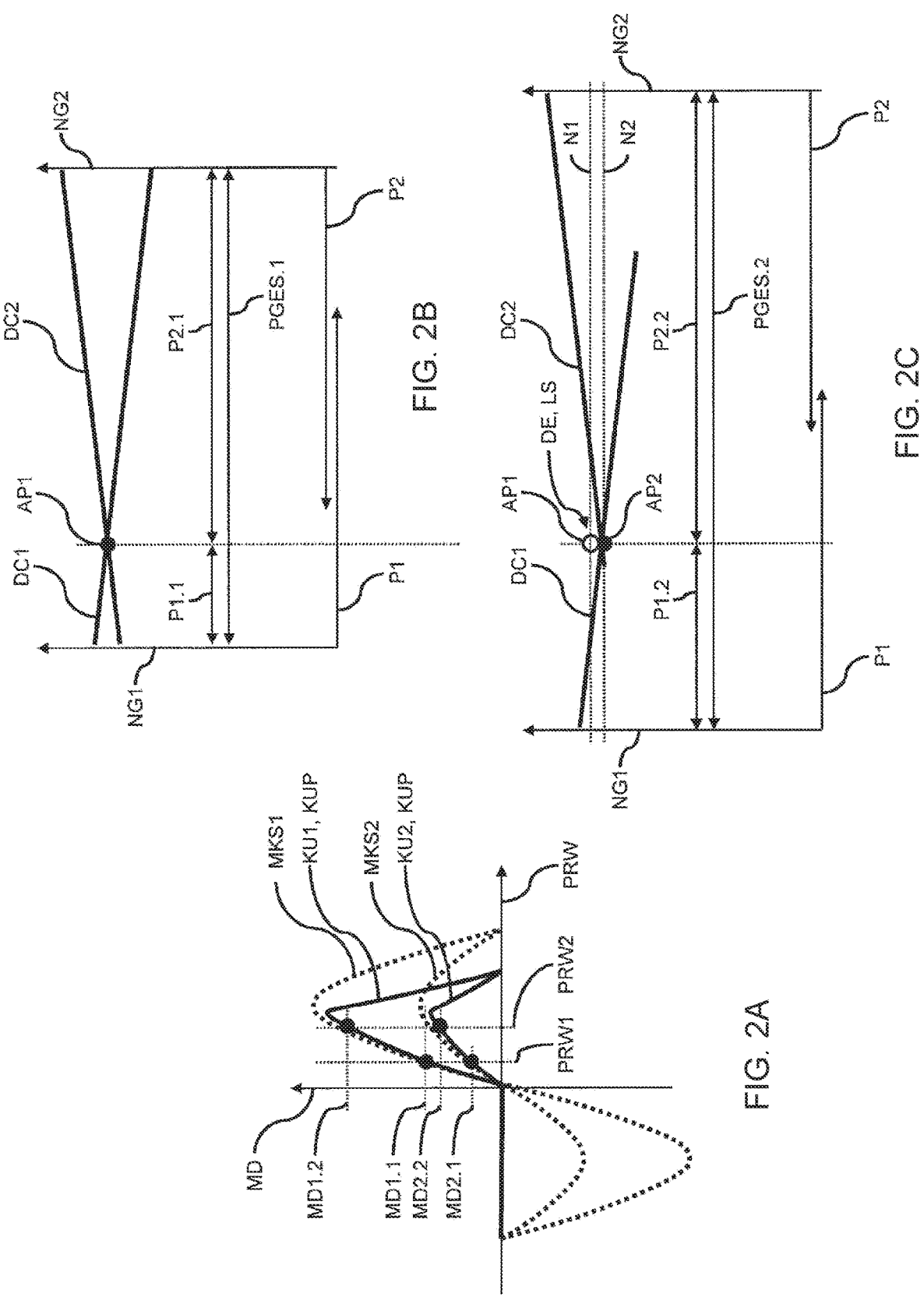
FIG. 2A shows a comparative representation of two transmission curves of two generator sets for clarification of the concept of machine-proportional transmission curves.
FIG. 2B and FIG. 2C show two representations of a first and a second operational point of the two generator sets for clarification of the concept of machine-proportional droop transmission curves.

FIG. 2A, FIG. 2B and FIG. 2C illustrate the principle of load acceptance by several generator sets connected in parallel as part of a so-called load sharing system in order to explain the technical background. As is well known, individual generator sets have an individual speed torque behavior in the form of a so-called droop characteristic.

FIG. 2A schematically shows a first transmission curve KU1 and a second transmission curve KU2 to illustrate the concept of machine-proportional transmission curves KU1, KU2, wherein both transmission curves KU1, KU2 are machine-proportional transmission curves KUP. This means that both transmission curves KU1, KU2 can assume different absolute values, that however, their relative change is the same between the two transmission curves KU1, KU2 when viewed with respect to a change in the pole wheel angle PRW. First transmission curve KU1, which is larger in magnitude—from a first generator 140 of a first generator set 100—assumes a first torque MD1.1 transmitted by first generator 140 at a pole wheel angle PRW1. With a second pole wheel angle PRW2, first transmission curve KU1 correspondingly assumes a second torque MD1.2 transmitted by first generator 140.1.

Second, smaller transmission curve KU 2—from a second generator 140' of a second generator set 100'—assumes a first torque MD2.1 transmitted by second generator 140' at first pole wheel angle PRW1. At second pole wheel angle PRW2, second transmission curve KU2 correspondingly assumes a second torque MD2.2 transmitted by second generator 140'. Despite the different absolute values of transmission curves KU1 and KU2, there is proportionality between them according to the relationship:

$$\frac{MD1.1}{MD1.2} = \frac{MD2.1}{MD2.2}$$

Accordingly, in FIG. 2B and FIG. 2C, a first operating point AP1 and a second operating point AP2 are represented by the number of the two generator sets 100, 100' with machine-proportional transmission curves KUP. A first generator set 100 has a first droop characteristic DC1, which is shown here as first generator set speed NG1 subject to a first rated power P1 of first generator set 100. A second generator set 100' has a second droop characteristic DC2, which is shown as a second generator set speed NG2 subject to a second rated power P2 of second generator set 100'. Both graphs are arranged opposite each other, in such a way that the axes with the respective rated power P1, P2 point to each other. Both linear curves of droop characteristics DC1, DC2 intersect accordingly in first operating point AP1, so that both generator set speeds NG1, NG2 are the same and thus also generator set frequency FG and generator set phase PG of both generator sets 100, 100'. The total rated power PGES.1 output by both generator sets 100, 100' at first operating point AP1, which is composed of rated power P1.1 output by first generator set 100 at first operating point AP1 and rated power P2.1 output by second generator set 100' at first operating point AP1, can be read in FIG. 2B from the opposite representation of the graph.

In FIG. 2C, the same number of the two sets of generators 100, 100' is shown in a second operating point AP2. This illustrates the behavior of the two generator sets 100, 100' in the event of a load surge LS with a drop in speed DE, in which a greater total rated power PGES.2 has to be provided due to a sudden increase in power demand from supply grid 1000. Due to the two droop characteristics DC1, DC2, rated power P1.2 now to be generated by first generator set 100 at the second operating point AP2 and the rated power P2.2 to be generated by second generator set 100' at the second operating point AP2 shifts both generator set speeds NG1, NG2 from a first speed N1 prevailing at the first operating point AP1 to a lower second speed N2 prevailing at the second operating point AP2. Viewed graphically, the area covered by both droop curves DC1 and DC2 widens so that they intersect again at operating point AP2, which represents the reduced speed.

The same proportionality of first transmission curve KU1 of first generator set 100 and second transmission curve KU2 of second generator set 100' is expressed in the present example in the same pitch of the gradients of first droop characteristic DC1 and second droop characteristic DC2 or of their curves in FIG. 2B and FIG. 2C.

To the extent that an increased power requirement for both generator sets 100, 100' leads to the same change in generator set speed NG1, NG2, accordingly both generator sets 100, 100' subsequently increase their respective generator set speed NG1, NG2 again to the same extent. A flat progression of droop characteristic DC1, DC2 means that generator set speed NG1, NG2 of generator set 100, 100' drops only slightly in the event of a sudden load surge. A steeper progression of droop characteristic DC1, DC2 would accordingly mean that the speed drops more sharply.

A droop characteristic can be achieved with a flat pitch with large turbines—in a fundamentally known manner—by a correspondingly large mass inertia of the rotating mass. FIG. 3A shows a detailed representation of a device for operating a generator set which, according to the concept of the present invention, has a target phase generator 164. This is located upstream of phase detector 134 in grid signal line 144 and is used to generate an engine target phase PV on the basis of a grid signal, in particular a grid phase PN. Due to the fixed torque-transmitting connection between engine 122 and generator 140, engine target phase PV corresponds to a generator set target phase PGS. For this purpose, target phase generator 164 has a grid signal input 164.1. Furthermore, the target phase generator 164 has a generator signal input 164.2, which can be used to provide generator set phase PG for the determination of engine target phase PV. Based on a phase difference PD between engine set phase PV and generator set phase PG, phase detector 134 determines a target pole wheel angle SPRW, which is provided as an input variable for phase controller 136 for controlling engine 122. Phase controller 136 is designed in particular as a phase-lock loop (PLL) controller.

By considering generator set phase PG in the determination of engine target phase PV, it can be advantageously ensured that target pole wheel angle SPRW is determined in such a way that a stalling torque in the form of a stalling threshold KG of generator 140 is not exceeded. For this purpose, the nominal pole wheel angle SPRW is determined, in particular, subject to a transmission curve KU of generator 140.

According to the concept of the present invention, the determination of the engine target phase PV is based on a model of a virtual seismic mass VSM, which is designed as a virtual, rotating mass with a virtual stabilization speed NV.

Virtual stabilization speed NV is a virtual rotational motion, which initially—as the starting point of the calculation—corresponds to the grid signal, whereby the rotational speed of virtual seismic mass VSM corresponds to grid frequency FN, and the rotation phase of virtual seismic mass VSM corresponds to grid phase PN.

Virtual stabilization speed NV corresponds in particular to grid signal SN before a sudden change in grid signal SN, especially before a load connection, when determining the engine target phase PV.

The fact that engine target phase PV is determined on the basis of grid phase PN, but does not correspond to it exactly, but is adapted, in particular shifted, taking into account the Geno phase PG, means that a "mass characteristic" of generator set 100 that stabilizes supply grid 1000 can be achieved advantageously in accordance with virtual seismic mass VSM. By not merely adapting a speed of engine 122, in particular the generator set speed NG, to a changing grid frequency and grid phase—especially in the event of a load surge—but by deliberately determining an engine target phase PV in such a way that the engine runs ahead of the grid phase, the load surge caused by the supply grid can be absorbed by the corresponding speed adjustment of the engine and thus a "virtual" mass inertia, without exceeding the maximum stalling torque of the generator.

Analogous to a turbine in a large power plant, which has a stabilizing effect on sudden load fluctuations due to its large rotating mass and the associated mass inertia, according to the concept of the present invention, control of engine 122 can be achieved by specifying an engine target phase PV, by which a greater mass inertia of the rotating part of generator set 100 is simulated than is actually physically present. In particular, in the case of a load connection in supply grid 1000, and a therewith associated sudden increase in torque acting on generator 140, the engine power can be increased for a short time by increasing the injection quantity in order to simulate a greater mass inertia of the engine. By taking the generator set phase PG into account, it is always ensured that a stalling torque is not exceeded. In this example, the injection quantity should not be selected in such a way that the increasing engine power causes the engine or pole wheel angle to advance in such a way that the generator set phase exceeds the stalling torque. If there is a threat of exceeding the stall torque, the engine is throttled, in particular the injection quantity EM is reduced.

Optionally, device 200, especially in generator signal line 146, can have a speed filter 172 for filtering out combustion-related torsional vibration shocks of engine 122. By way of such a speed filter 172, which is designed in particular as a low-pass filter, high-frequency interference signals can be advantageously filtered out of generator set signal SG.

Optionally, device 200, in particular phase regulator 136 can have a damping element 138 in order to have a damping effect on device 200 in terms of control technology and to prevent device 200 from oscillating, especially during load surges.

Optionally, device 200, in particular phase controller 136 can have a transmission curve adjustment module 170 for setting a proportional transmission curve KUP with respect to a number of generator sets. By way of such a machine-proportional transmission curve KUP, a uniform load assumption behavior of a number of generator sets can be advantageously achieved.

Device 200 can be designed as an electronic control unit 220 or as part of it. In a further development the individual components of device 200 may be arranged differently; for example, phase controller 136 may be designed as part of another electronic control unit 220', and the other components, in particular phase detector 134 and target phase generator 164, may be designed as a separate control module.

FIG. 3B shows a more detailed schematic representation of target phase generator 164. It has a synchrony module 164A, a calculation module 164B and a grid signal module 164C. Synchrony module 164A can be used to determine—in particular by obtaining a Boolean synchronization variable SYNC with the content TRUE or FALSE—whether a difference between a grid phase PN of the supply grid and generator set phase PG is equal to 0, and both phases are therefore synchronous. For example, the synchrony variable SYNC can be provided via a phase detector. In this case, where there is consequently no need for load assumption by the generator set, the synchrony variable SYNC is equal to TRUE. If, in the event of a load surge, the grid frequency drops and the grid phase is no longer synchronous with the generator set phase, synchrony variable SYNC is set to FALSE and first output variable OUT1 is provided to calculation module 164B.

On receipt of first output variable OUT1, calculation module 164B starts with the determination of engine target phase PV on the basis of a virtual seismic mass VSM, which has a virtual stabilization speed NV, which is determined on the basis of grid frequency FN.

Due to the fixed torque-transmitting connection between engine 122 and generator 140, engine phase PM corresponds to generator set phase PG. In further developments in which a gearbox is still arranged between engine 122 and generator 140, engine phase PM can be converted into generator set phase PG on the basis of the known geometrical relationship, in particular the known gear ratio, especially over a constant factor. For this reason, engine target phase PV also corresponds to a generator set target phase PGS or can be converted into it.

Engine target phase PV is provided as a result of the calculation by target phase generator 164, in particular as an input variable for phase detector 134. Moreover, engine target phase PV is provided to grid signal module 164C in the sense of a return, where it is compared with grid phase PN. In the case where engine target phase PV is ahead of grid phase PN in such a way that it is greater than grid phase PN, but smaller than grid phase PN plus a stalling threshold KG, in particular smaller than grid phase PN plus 90°, a risk of stalling is effectively avoided and a second output variable OUT2 is set to TRUE and made available to calculation module 164B. In this case, the following applies:

$$PN > PV > PN + KG$$

If in the other case, the engine target phase PV is in particular greater than grid phase PN plus a stalling threshold KG, the second output variable OUT2 is accordingly set to FALSE and made available to calculation module 164B, whereupon engine target phase PV is immediately reduced. As a result, a smaller input size is provided to the phase detector, whereupon a lower target pole wheel angle is calculated and the phase controller reduces the injection quantity accordingly to avoid the risk of stalling threshold. The reduction is optionally achieved by adjusting stabilization speed NV of virtual seismic mass VSM. This ensures that stabilization speed NV and thus the phase position of virtual seismic mass VSM does not run ahead of that of grid frequency FN.

Figure 3D:
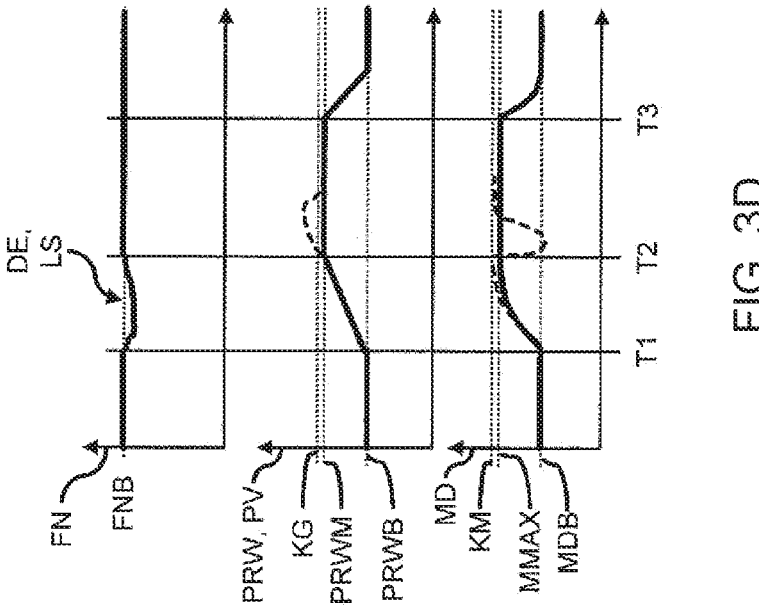
FIG. 3D shows a chronological progression of a further development of the method in a strongly schematic representation.
Figure 3C:
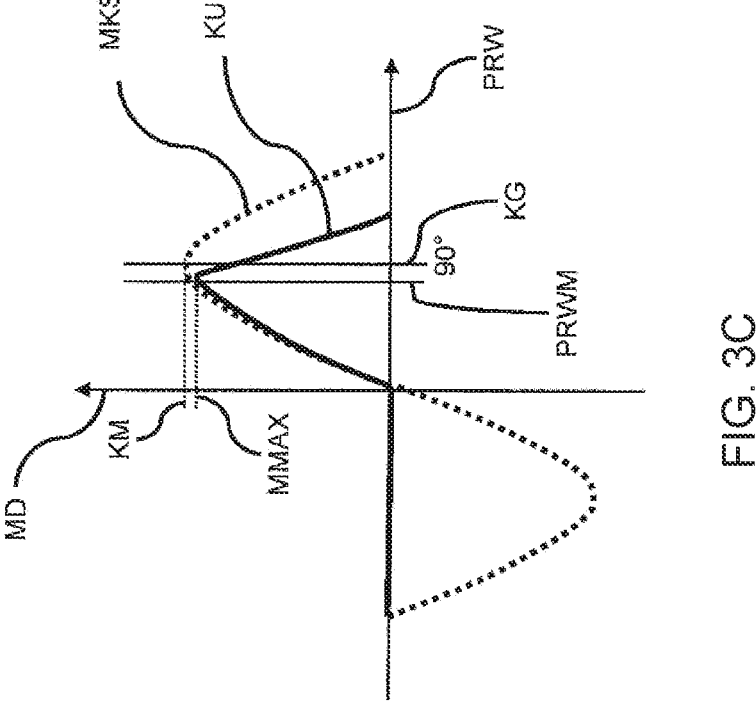
FIG. 3C is a schematic representation of a transmission curve.

FIG. 3C schematically shows a transmission curve KU of phase regulator 136, which is also taken into account in particular in target phase generator 164 when determining the engine target phase PV. The transmission curve KU is shown as progression of a torque MD transmitted by generator 140 subject to pole wheel angle PRW of generator 140. In particular, the fact that engine target phase PV does not deviate more than the sum of a stalling threshold KG, that is, as a stalling angle of 90° in particular, from generator set phase PG of generator 140 ensures that a nominal pole wheel angle SPRW always remains below stalling threshold, and thus a stalling of generator 140 is avoided. Transmission curve KU is always below a torque curve MKS of generator 140, in particular of synchronous machine 142, whereby torque curve MKS describes the maximum torque MD transmittable from generator 140 subject to pole wheel angle PRW. At stalling threshold KG, which in the present case is 90°, the torque curve MKS has reached a maximum stalling torque KM. For a pole wheel angle PRW that is greater than the stalling threshold, torque curve MKS decreases again. A machine-proportional transmission curve KUP is a special form of a transmission curve KU, which is advantageous for a number of several sets of generators that should have a uniform load acceptance behavior. This is especially the case if in the number of generator sets, generators of different sizes or respectively generator sets are used, and thus different stalling torques are present.

A maximum torque MMAX as the maximum value of the maximum torque MD transmitted by generator 140 according to transmission curve KU is less than or equal to the stalling torque KM and, at a maximum pole wheel angle PRWM, is below or at the stalling threshold KG.

In FIG. 3D, a schematic curve of grid frequency FN, pole wheel angle PRW of a generator 140 and a torque MD transmitted by generator 140 is shown in three diagrams at three points in time T1, T2, T3. In the initial state, grid frequency FN is at the value of an operating grid frequency FNB. At the first point in time T1, a load surge LS occurs, which leads directly to a drop in speed DE of generator set speed NG due to the suddenly increased power demand from supply grid 1000 caused by load surge LS. Over time, the difference between the grid speed drop and the constantly running virtual seismic mass VSM adds up to a phase difference.

In order to absorb load surge LS, engine target phase PV is increased at first point time T1 by target phase generator 164, and subsequently the pole wheel angle PRW is increased accordingly by phase detector 134 as the input variable for phase regulator 136 to increase torque MD transmitted by generator 140, starting from an operating pole wheel angle PRWB at a first time point T1 to a maximum pole wheel angle PRWM at a second time point T2. As a result, torque MD transmitted by the generator is increased from a first operating torque MDB at time point T1 to the torque at a second time point T2, so that the grid frequency is stabilized to the original value. If, at the second point in time T2, pole wheel angle PRW reaches a maximum pole wheel angle PRWM, which is below the stalling threshold, for example at 85°, the torque is limited according to FIG. 2C in order to avoid stalling. This is indicated in the dashed progression.

The method described herein can advantageously achieve a correspondingly flat droop characteristic, in which the transmission torque of the generator can be maximized on the basis of a model of a virtual seismic mass, taking into account a possible risk of stalling, and in particular also by a correspondingly strong engine of the generator set, that is, one having sufficiently rated power. By controlling this engine accordingly, in particular accelerating it, by adjusting the torque-forming combustion control variables, a drop in the generator set speed can be kept within limits in the event of a load surge, and the generator set speed can be quickly returned to a setpoint grid frequency. Thus, the greater inertia of a large turbine or the more speed-stable overrun behavior of such a large turbine during a load surge is simulated by a corresponding rated power of the engine and the method according to the concept of the present invention in order to improve the grid-stabilizing properties of the generator set.

LIST OF REFERENCES

100 Generator set
112 converter
120 internal combustion engine
122 engine
124 main shaft of generator set
126 injection device
134 phase detector
136 phase regulator
138 damping element
140 generator
142 synchronous machine
144 grid signal-line
146 generator signal line
150 generator set controller
154 switch
157 speed control line
158 phase regulator line
162 synchronizing controller
164 target phase generator
164.1 grid signal input
164.2 generator signal input
164A synchrony module
164B calculation module
164C grid signal module
170 transmission curve adjustment module
172 speed filter
180 engine control unit
200 device to operate a genertor set, phase control circuit
1000 supply grid
AP1, AP2 first, second operating point
DC droop characteristic
DC1, DC2 first, second droop characteristic
DE drop in speed
EM injection quantity
EP torque-forming combustion control variable
FG Geno frequency, generator set frequency
FN grid frequency
FNB operating grid frequency
IE excitation current
KG stalling threshold
KM stalling torque
KU transmission curve of generator
KUP, KUP'machine porportional transmission curve
LS load surge
MD transmission torque
MKS maximum torque curve of generator
MMAX maximum torque of transmission curve
MPRK machine proportional phase regulating curve
NG generator set speed
NG1, NG2 first, second generator set speed
NV virtual stabilization speed
OUT1, OUT2 first, second output variable
P electric power
P1, P2 rated power of a first, second generator set
PGES total rated power of a number of generator sets PD phase difference
PG generator set phase
PGS generator set target phase
PM engine phase
PN grid phase
PRM phase regulating mode
PRW pole wheel angle
PRWM maximum pole wheel angle
SG generator set signal
SGN signal of generator set speed
SN grid signal
SPRW target pole wheel angle
SYNC synchrony variable
UG voltage produced by the generator, generator set voltage
UN grid voltage
VSM virtual seismic mass While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating a generator set, the method comprising the steps of:

providing that the generator set includes an internal combustion engine and a generator which is connected to an engine of the internal combustion engine in a torque-transmitting manner such that the generator set is configured for providing electrical power to an electric supply grid or for receiving electrical power from the electric supply grid, which is associated with a grid frequency, a grid voltage, and a grid phase;

specifying a generator set frequency and a generator set phase of a voltage of a power produced by the generator;

adapting a torque-forming combustion control variable for the engine;

operating the engine of the internal combustion engine in a phase controlled mode by regulating an engine phase via a phase regulator to change a generator set phase, wherein the engine phase is in a predetermined phase relationship with the generator set phase;

setting the torque-forming combustion control variable for the engine for adapting the engine phase to a target engine phase; and determining an engine target phase using a target phase generator upstream of the phase regulator, the target phase generator determining the engine target phase subject to a computational rotational reference system that describes a rotary motion of a fictitious inertia-increasing mass with a virtual stabilization speed such that the fictitious inertia-increasing mass rotates at the virtual stabilization speed, a mass of the fictitious inertia-increasing mass being larger than a mass of a rotating portion of the generator set.

2. The method according to claim 1, wherein the virtual stabilization speed is assigned subject to the grid frequency and the grid phase.

3. The method according to claim 2, wherein the virtual stabilization speed is adjusted depending on a stalling threshold, such that at least one of the engine target phase and a target pole wheel angle assumes a value between 0° and the stalling threshold.

4. The method according to claim 1, wherein the engine target phase is determined subject to a transmission curve of the generator.

5. The method according to claim 4, wherein the engine target phase is determined such that a transmission torque of the generator is increased.

6. The method according to claim 4, wherein a value of the transmission curve for a plurality of positive values of a pole wheel angle is less than or equal to a corresponding value of a maximum torque curve of the generator.

7. The method according to claim 4, wherein the torque-forming combustion control variable is an injection quantity.

8. The method according to claim 4, wherein a stalling threshold is 90°.

9. The method according to claim 4, wherein the transmission curve is formed as a machine-proportional transmission curve.

10. The method according to claim 1, wherein the torque-forming combustion control variable for a torque-forming combustion setting of the engine is selected from the group consisting of: a fuel injection control variable; a gas injection control variable; and a throttle valve control variable.

11. The method according to claim 1, wherein the generator is a synchronous generator.

12. The method according to claim 1, wherein the engine phase is determined using a phase position of a crankshaft.

13. The method according to claim 1, wherein at least one of a generator voltage frequency and a generator voltage phase is calculated from at least one of an engine speed and the engine phase by taking into account at least one of:

(a) a number of pole pairs of the generator; and (b) a mechanical blocking angle between the internal combustion engine and the generator.

14. A device for operating a generator set which includes an internal combustion engine and a generator, the internal combustion engine including an engine, the generator being connected to the engine and thereby being configured for torque transmission, the generator set being configured for feeding electrical power into an electrical supply grid, which is associated with a grid frequency, a grid voltage, and a grid phase, the generator set further including a rotating portion, the device comprising:

a generator set controller configured for specifying a generator set frequency and a generator set phase of a voltage of a power generated by the generator;

an engine control unit configured for adapting a torque-forming combustion control variable for the engine of the internal combustion engine;

a phase regulator configured for operating the engine of the internal combustion engine in a phase controlled mode by regulating an engine phase to change a generator set phase, wherein the engine phase is in a defined geometrical relationship with the generator set phase, the engine control unit being configured for adjusting the torque-forming combustion control variable for the engine to adapt the engine phase to a target engine phase; and a target phase generator positioned upstream of the phase regulator, the target phase generator being configured for determining the target engine phase subject to a computational rotational reference system that describes a rotational motion of a fictitious inertia-increasing mass with a virtual stabilization speed such that the fictitious inertia-increasing mass rotates at the virtual stabilization speed, a mass of the fictitious inertia-increasing mass being larger than a mass of the rotating portion of the generator set.

15. The device according to claim 14, further including a damping element.

16. The device according to claim 14, further including a transmission curve adaptation module, which is configured for adjusting a machine-proportional transmission curve of the generator set, wherein the machine-proportional transmission curve of the generator set is proportional relative to at least one other machine-proportional transmission curve of at least one additional generator set.

17. The device according to claim 14, further including a speed filter, which is configured for filtering out a plurality of combustion-related torsional vibration surges from a generator set signal of a generator set speed.

18. A generator set, comprising:

an internal combustion engine including an engine;

a generator connected to the engine of the internal combustion engine in a torque-transmitting manner and thereby being configured for supplying energy to a supply grid, which is associated with a grid frequency, a grid voltage, and a grid phase;

a rotating portion; and a device configured for operating the generator set, the device including:

a generator set controller configured for specifying a generator set frequency and a generator set phase of a voltage of a power generated by the generator;

an engine control unit configured for adapting a torque-forming combustion control variable for the engine of the internal combustion engine;

a phase regulator configured for operating the engine of the internal combustion engine in a phase controlled mode by regulating an engine phase to change a generator set phase, wherein the engine phase is in a defined geometrical relationship with the generator set phase, the engine control unit being configured for adjusting the torque-forming combustion control variable for the engine to adapt the engine phase to a target engine phase; and a target phase generator positioned upstream of the phase regulator, the target phase generator being configured for determining the target engine phase subject to a computational rotational reference system that describes a rotational motion of a fictitious inertia-increasing mass with a virtual stabilization speed such that the fictitious inertia-increasing mass rotates at the virtual stabilization speed, a mass of the fictitious inertia-increasing mass being larger than a mass of the rotating portion of the generator set.

19. The generator set according to claim 18, further including a combustion actuator which is connected to the engine control unit and which is configured for being controlled using the torque-forming combustion control variable for torque-forming combustion adjustment of the engine, the combustion actuator including a fuel allocation device formed as at least one of an injector, an injection device, a throttle device, and an ignition device.

20. The generator set according to claim 18, further including a drive shaft, wherein the engine is connected is connected to the generator via the drive shaft in a torque-transmitting manner, wherein the generator includes a rotor and a stator, and wherein the generator set is configured such that during operation of the internal combustion engine the rotor is rotationally driven relative to the stator so as to generate a generator voltage at a generator voltage frequency.

* * * * *